Oct. 9, 1945.  E. H. DUKE ET AL  2,386,301
MECHANISM FOR ACCELERATING THE WHEELS OF THE LANDING GEAR OF AN AIRPLANE
Filed Aug. 14, 1943  2 Sheets-Sheet 2

Earl Hamilton Duke
John Lee Wait, Jr. INVENTORS

BY
Victor J. Evans & Co.
ATTORNEYS

Patented Oct. 9, 1945

2,386,301

UNITED STATES PATENT OFFICE 2,386,301

MECHANISM FOR ACCELERATING THE WHEELS OF THE LANDING GEAR OF AN AIRPLANE

Earl Hamilton Duke and John Lee Wait, Jr., Houston, Tex.

Application August 14, 1943, Serial No. 498,636

2 Claims. (Cl. 244—103)

This invention relates to mechanism for accelerating the wheels of a landing gear of an airplane preparatory to making a landing, and has for an object to provide an air turbine and mechanism for suppyling the turbine with motive fluid to rotate a respective landing wheel preparatory to landing in order to prevent a noseover, wear and tear on the tires, reduced strain on the landing gear, reduced wear on rubber, and prevent tire blowouts at a critical landing speed.

A further object is to provide apparatus of this character which will be formed of a few strong, simple and durable parts, which will be inexpensive to manufacture, and which will not easily get out of order.

With the above and other objects in view the invention consists of certain novel details of construction and combinations of parts hereinafter fully described and claimed, it being understood that various modifications may be resorted to within the scope of the appended claims without departing from the spirit or sacrificing any of the advantages of the invention.

In the accompanying drawings forming a part of this specification:

Figure 4 is a side elevation of the air compressor.

Figure 1:
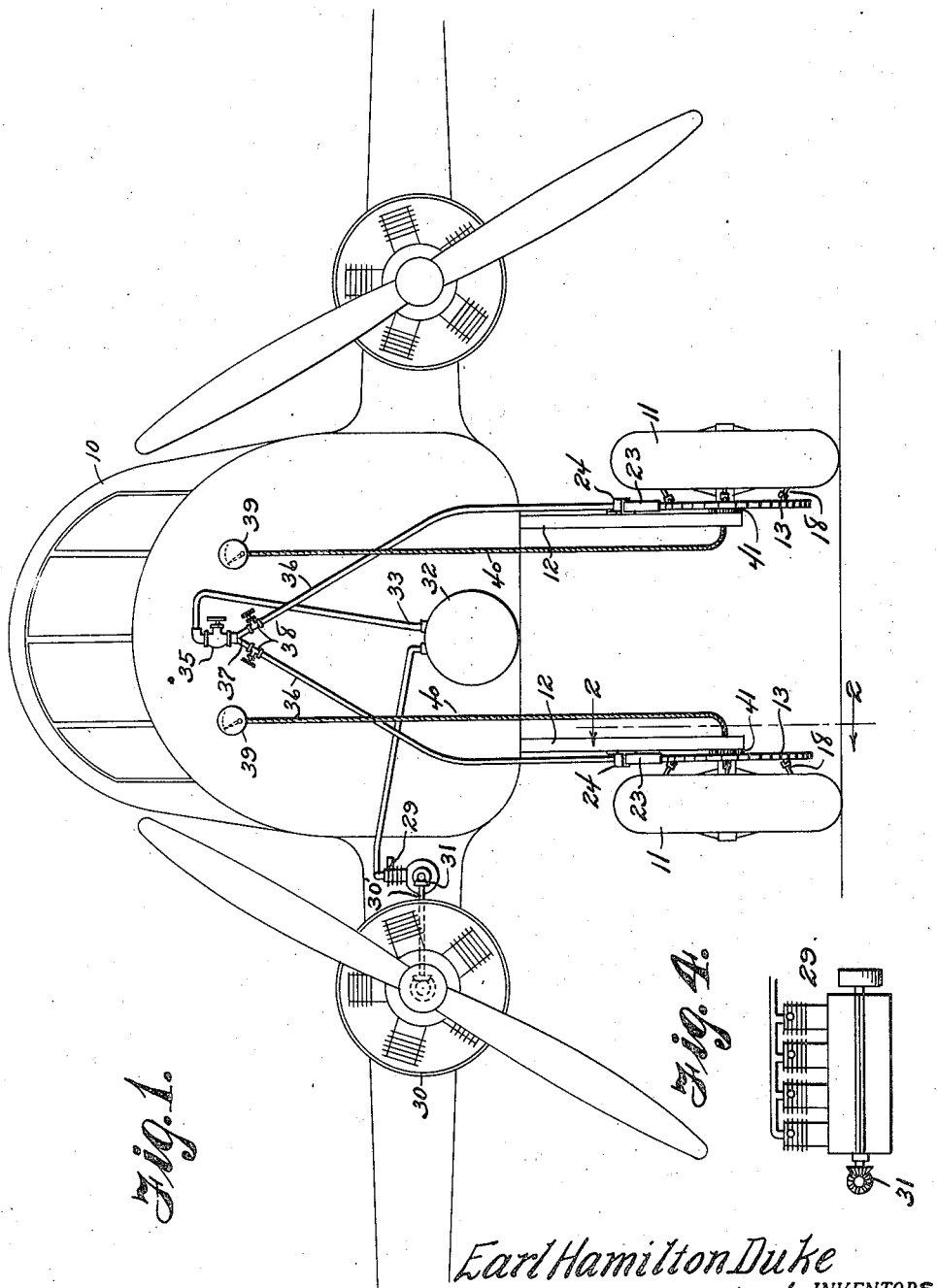
Figure 1 is a fragmentary front elevation of an airplane equipped with mechanism for accelerating the wheels of the landing gear, constructed in accordance with the invention.

Referring now to the drawings in which like characters of reference designate similar parts in the various views, 10 designates a conventional airplane having spaced rubber tired landing wheels 11 supported by frame bars 12 which extend downward from the fuselage.

It is desirable to turn the landing wheels in the direction they must turn when touching the ground, while the airplane is still in the air and about to make a landing, and this is especially true of large landing wheels which are of great weight to support heavy aircraft.

To accomplish this the present invention provides an air turbine 13 for each landing wheel adapted to be turned axially by compressed air under control of the pilot.

Each air turbine is in the nature of a disk having pockets 14 in the periphery each pocket having an inclined wall 15 and an arcuate abutment wall 16 against which the compressed air blast is impinged to rotate the turbine.

The turbine is attached yieldably to the disk 17 of the ground wheel, through the medium of braces 18 preferably formed of telescoping members one of which forms a piston and the other a cylinder, there being a vent in the cylinder as is customary in air bumper construction. There are preferably four of these braces, arranged at an angular distance of ninety degrees apart, the cylinder member of each brace being pivotally connected to a lug 19 which projects from the disk of the wheel and the piston member of the brace being pivotally connected to a lug 20 which projects from the side of the air turbine. The air turbine and wheel are thus assembled as a unit while the braces of air bumper construction permit some yielding movement of the wheel relatively to the turbine to prevent breakage.

Each turbine is provided with a hub 21 which is loose on a stub axle 22 which projects from the lower end of the respective frame bar 12.

In further carrying out the invention a compressed air nozzle 23 is supported on a tubular bracket arm 24 which is secured to the respective frame bar 12 above the turbine through the medium of an adjusting bolt 25 engaged through an ear 26 on the bracket and through the frame bar. The nozzle is provided with a closed front end 27 and is formed with an outlet opening 28 in the bottom adjacent the closed front end and of sufficient length to supply compressed air to two consecutive pockets 14.

The source of compressed air supply may be of several origins, and in the present embodiment is shown as a small compressor 29 of the reciprocating piston type which is connected to be driven from the engine by a shaft 30 and gears 31 or other motion transmission means. The output of the compressor is released through a pipe 9 into an air tank 32 having an outlet pipe 33 controlled by a valve 35 which is in convenient reach of the pilot. A pair of pipes 36 are connected to the valve 35 through the medium of a Y-coupling 37 and respective valves 38. However where the airplane is equipped with hydraulic brakes the compressed air supply tank thereof may be utilized as a source of compressed air supply, or even a single compressor may be used, coupled to any suitable moving part of the engine.

Figure 2:
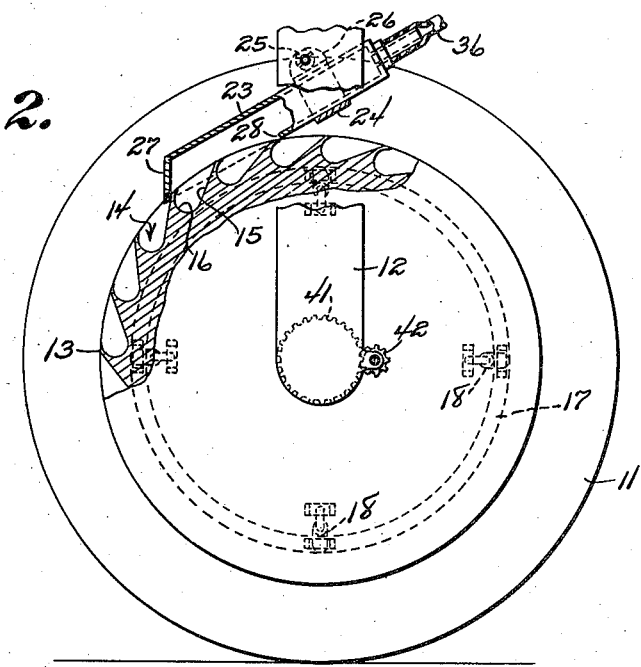
Figure 2 is a vertical sectional view taken on the line 2—2 of Figure 1 showing the air turbine, compressed air nozzle, and the energizing gears for a respective speedometer.
Figure 3:
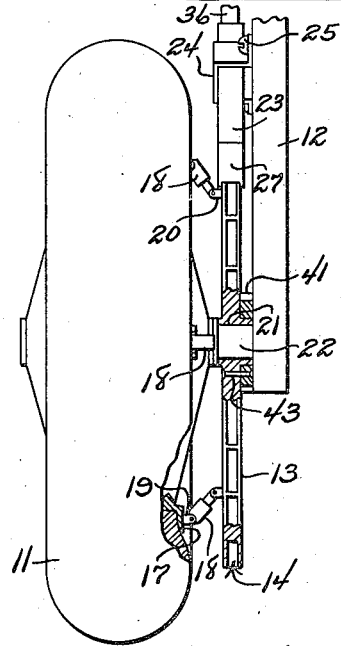
Figure 3 is a front elevation of the wheel and mechanism shown in Figure 2, with parts broken away.

Each ground wheel has associated therewith a respective speedometer 39 which is located within view of the pilot and is connected by a flexible shaft 40 with a gear 41, through the medium of a pinion 42 on the shaft meshing with the gear, see Figure 2, the gear being fixed to the turbine, see Figure 3, through the medium of bolts 43 or other connectors.

From the above it will be seen that the pilot may operate the valve 35 to release compressed air from the flasks 32 to the respective air nozzles 23 just before the airplane is about to touch the wheels to the ground so that the wheels will be turning in the proper direction when they touch the ground for the purpose heretofore explained.

What is claimed is:

1. Means for rotating the resilient landing wheels of airplanes prior to the contact of such wheels with the ground, comprising a disk arranged adjacent to and concentric with each landing wheel and each having tangentially disposed pockets in its periphery, each pocket formed with an inclined wall and an arcuate abutment wall, resilient braces connecting each disk with each wheel and each brace including a vented cylinder and a piston therein, the cylinder being connected to the wheel and the piston to the disc, and compressed air means for driving the discs, said means including a nozzle device formed to project compressed air into multiple consecutive pockets simultaneously.

2. Means for rotating the resilient landing wheels to airplanes prior to the contact of such wheels with the ground, comprising a disk rotatably arranged adjacent to and concentric with each landing wheel, and each having tangentially disposed pockets in its periphery, each pocket formed with an inclined wall and an arcuate abutment wall, a plurality of diametrically aligned resilient connecting braces between each disc and its wheel, each brace having a vented cylinder and a piston operable therein, pins carried by the wheel respectively pivotally connected to the cylinders, and the pistons pivotally connected to the discs, and compressed air means for driving the discs, said compressed air means including a nozzle for each disc, and each nozzle having a closed front and an outlet opening extending over multiple pockets in the disc to actuate the same.

EARL HAMILTON DUKE.
JOHN LEE WAIT, Jr.